(12) United States Patent
Wen

(10) Patent No.: US 8,687,699 B1
(45) Date of Patent: Apr. 1, 2014

(54) METHOD AND/OR APPARATUS FOR OPTIMIZED VIDEO CODING

(75) Inventor: Jiangtao Wen, La Jolla, CA (US)

(73) Assignee: Geo Semiconductor Inc, Santa Clara, CA (US)

( * ) Notice: Subject to any disclaimer, the term of this patent is extended or adjusted under 35 U.S.C. 154(b) by 1729 days.

(21) Appl. No.: 11/434,953

(22) Filed: May 16, 2006

(51) Int. Cl.
    *H04N 7/12* (2006.01)
(52) U.S. Cl.
    USPC .......................................................... 375/240.2
(58) Field of Classification Search
    USPC .......................................................... 375/240.2
    See application file for complete search history.

(56) References Cited

U.S. PATENT DOCUMENTS

| 6,636,266 B2 * | 10/2003 | Takahashi | 348/445 |
| 7,764,740 B2 * | 7/2010 | Seok et al. | 375/240.16 |
| 2004/0125204 A1 * | 7/2004 | Yamada et al. | 348/97 |
| 2005/0135484 A1 * | 6/2005 | Lee et al. | 375/240.16 |
| 2006/0198439 A1 * | 9/2006 | Zhu | 375/240.03 |

OTHER PUBLICATIONS

B. Girod et al., A Content-Dependent Fast DCT for Low Bit-Rate Video Coding, IEEE Intl. Conf. Image Processing, 1998, pp. 80-84.

* cited by examiner

*Primary Examiner* — Anner Holder
(74) *Attorney, Agent, or Firm* — Sughrue Mion, PLLC (57) ABSTRACT

A method for processing a video signal, comprising the steps of (A) generating a plurality of residual blocks by performing motion compensation on a current block of a video signal comprising a series of frames, where each frame comprises a plurality of blocks, (B) generating a plurality of rate-distortion costs for a plurality of bitstream segments generated for each of the residual blocks using a first transform, (C) determining a residual block having an optimal cost, and (D) transforming the selected block with the optimal cost using a second transform, where the first transform has a lower complexity than the second transform.

18 Claims, 7 Drawing Sheets

METHOD AND/OR APPARATUS FOR OPTIMIZED VIDEO CODING

FIELD OF THE INVENTION

The present invention relates to video processing generally and, more particularly, to a method and/or apparatus for implementing optimized video coding.

BACKGROUND OF THE INVENTION

A key component in conventional state-of-the-art video coding systems is the motion estimation (ME) process. Motion estimation compares a block of pixels of a frame of an input video signal (i.e., an input block) with a block of pixels in a reconstructed video frame (i.e., a reference block) that has already been encoded. The location of the reference block is represented by motion vectors (MVs). Conventional systems only code the difference between the input block and the reference block, referred to as a residual block. A number of residual blocks are coded via transform, quantization and entropy coding. Difference choices of the reference blocks (or equivalently MVs) can lead to significant different video coding performances, usually measured in the rate-distortion sense. Such differences can be determined by jointly examining the distortion introduced as a result of the non-invertible quantization process (distortion) as well as the number of bits (bit rate) needed to represent all of the information needed by the decoder to reconstruct the coded input block.

Both the distortion and bit rate information are dependent on the motion vectors selected, and are only available after the transform, quantization and entropy coding processes. Because of the computational complexity and memory and bandwidth requirements involved in performing the transform, quantization and entropy coding, the ME process in conventional systems usually evaluates the different MV choices among a usually large number (often hundreds or even thousands) of possibilities (i.e., candidates) with criteria based either purely on the original residual information (i.e., prior to quantization) or in some cases original residual and the motion vector information, as opposed to the distortion and rate information after performing quantization-dequantization and entropy coding, including bit rate for all information needed by the decoder, including header, motion, and transform information. The accurate bitrate information is obtained after optional motion estimation, motion compensation, and transform have been performed.

It would be desirable to incorporate distortion and overall rate information into the evaluation of MV candidates in a ME process through a low complexity procedure so that the overall rate and distortion performance associated with the selection of each MV candidate may be evaluated without performing the full transform, quantization and entropy coding process for each motion vector candidate.

SUMMARY OF THE INVENTION

The present invention concerns a method for processing a video signal, comprising the steps of (A) generating a plurality of residual blocks by performing motion compensation on a current block of a video signal comprising a series of frames, where each frame comprises a plurality of blocks, (B) generating a plurality of rate-distortion costs for a plurality of bitstream segments generated for each of the residual blocks using a first transform, (C) determining a residual block having an optimal cost, and (D) transforming the selected block with the optimal cost using a second transform where the first transform has a lower complexity than the second transform.

The objects, features and advantages of the present invention include providing method and/or apparatus for video encoding that may (i) balance low complexity and high complexity transforms and/or (ii) provide an efficient coding system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention provides a method and/or apparatus for performing motion estimation with a low cost estimation process. The present invention may also be used by those skilled in the art in other parts of video coding where a comprehensive performance evaluation one or more encoding decisions and/or parameters is needed. The overall rate and distortion associated with each MV candidate may be analyzed to enable true rate and distortion based motion estimation. An estimation of the distortion and rate information associated with each motion vector candidate may be implemented with a low complexity transform, such as Hadamard transform (HT). Such a low cost transform may be useful for determining distortion and rate information, but may not be capable of encoding a bitstream that is compliant with a desired standard, such as H.264/AVC. After computing motion vector estimates with the first transform, the computationally more expensive transform used by the specific standard, such as a DCT transform, is normally implemented to produce a rate-distortion optimal standard compliant coded representation of the input signal. When obtaining the rate and distortion information associated with the HT coefficients after motion compensation with each motion vector candidate, various ways for estimating HT coefficients, rate and distortion at lower computational and memory complexities may be implemented.

Figure 1:
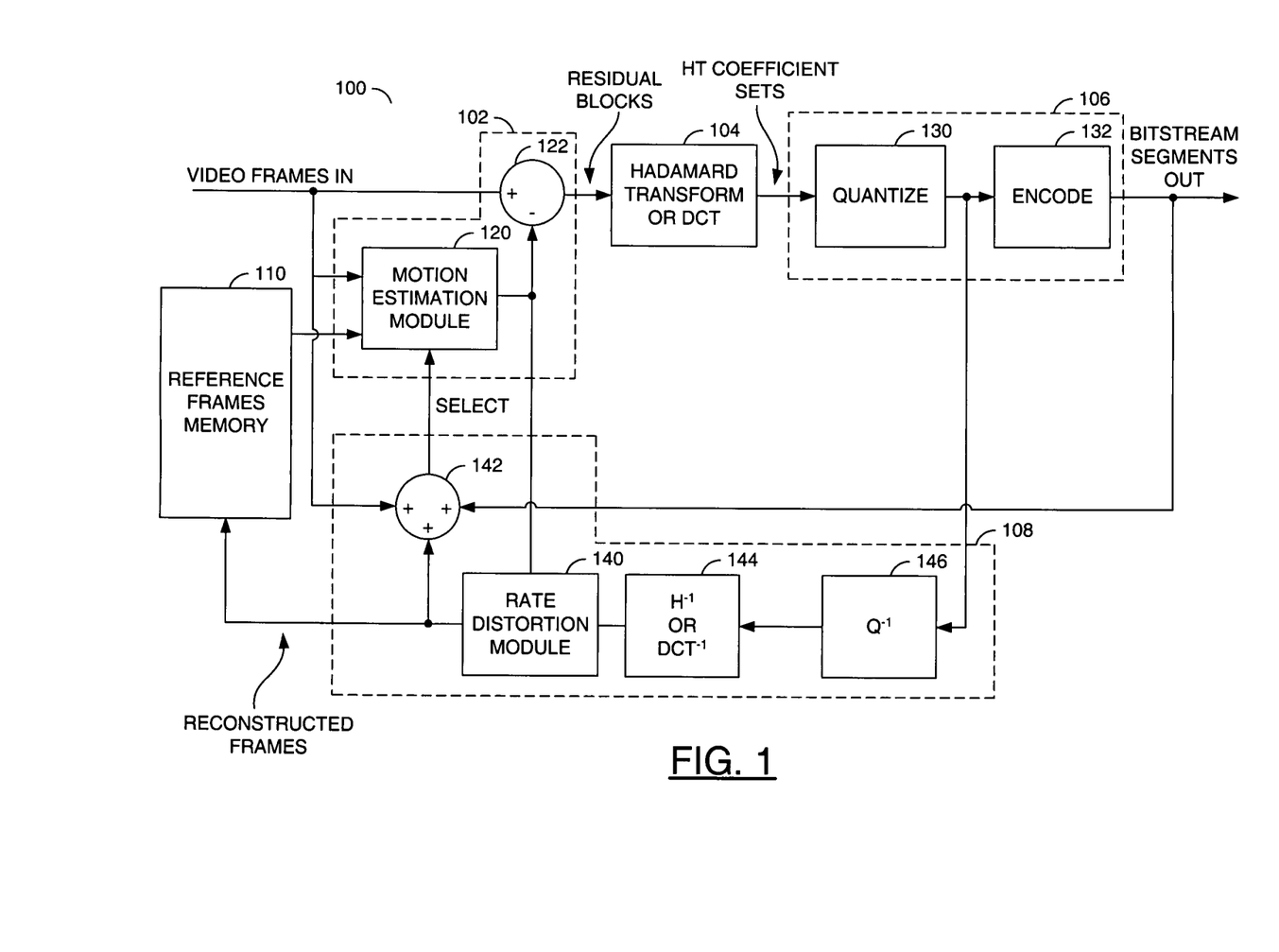
FIG. 1 is a block diagram of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, a block (or circuit) 108 and a block (or circuit) 110. The block 102 may be implemented as a motion estimation section. The block 104 may be implemented as a transform section. The block 106 may be implemented as a DCT transform quantanization and encoding section. The block 108 may be implemented as a logic section. The block 110 may be implemented as a reference frames memory section. The block 102 generally comprises a motion estimation module 120 and a compare block 122. The block 104 may have a first mode that may perform a first transform, such as a Hadamard transform or a second mode that may perform a second transform, such as a discrete cosine transform. The particular transform used may vary based on whether an estimation is needed or whether coding is needed.

The block 106 generally comprises a quantization section 130 and an encoding section 132. The block 108 generally comprises a rate distortion section 140, a compare section 142, an inverse transform section 144 and an inverse quantanization section 146. The section 108 may generate a signal (e.g., SELECT) that may be presented to the estimation section 102.

Figure 2:
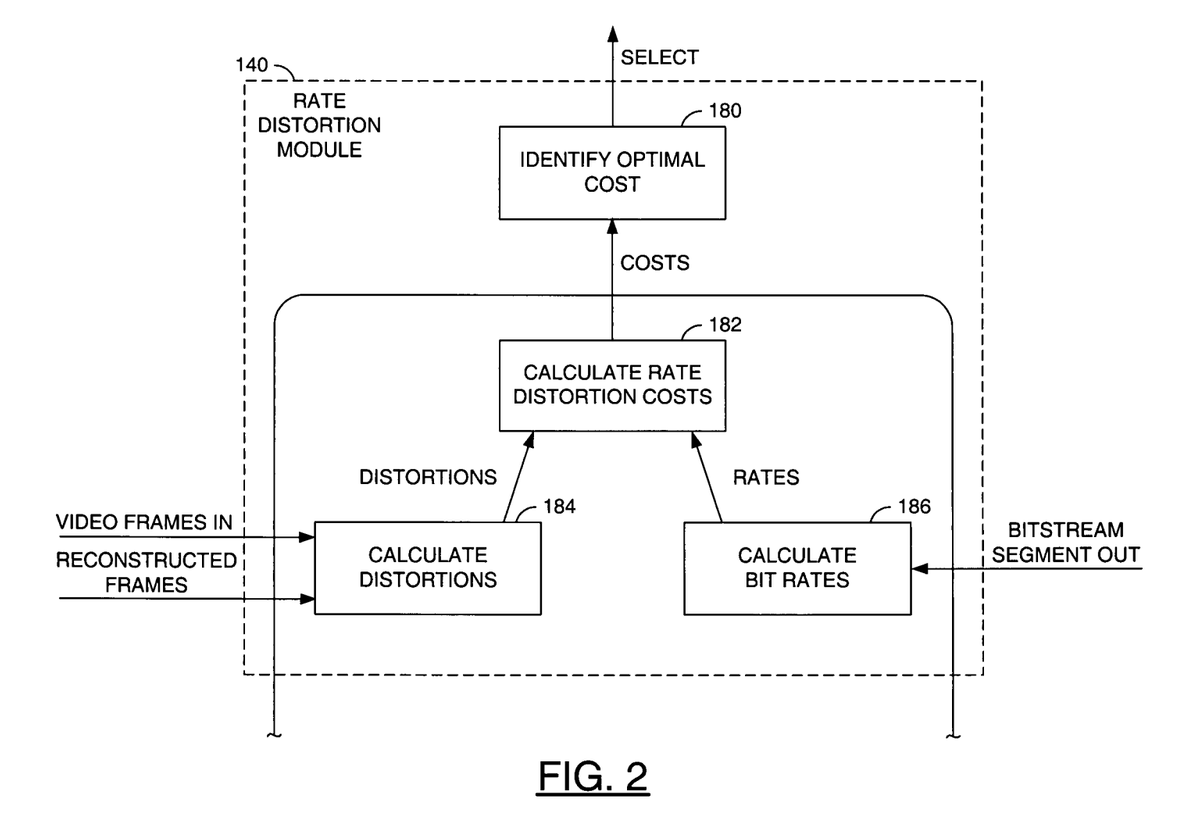
FIG. 2 is a block diagram of the rate distortion module of FIG. 1.

Referring to FIG. 2, a more detailed block diagram of the rate distortion module is shown. The rate distortion module generally comprises a block (or circuit) 180, a block (or circuit) 182, a block (or circuit) 184 and a block (or circuit) 186. The block 180 may be used to identify an optimal cost. The block 182 may calculate rate distortion costs. The block 184 may be used to calculate particular distortions based on the video frames and reconstructed frames. The block 186 may be used to calculate the rate of particular segments of the bitstream.

Figure 3:
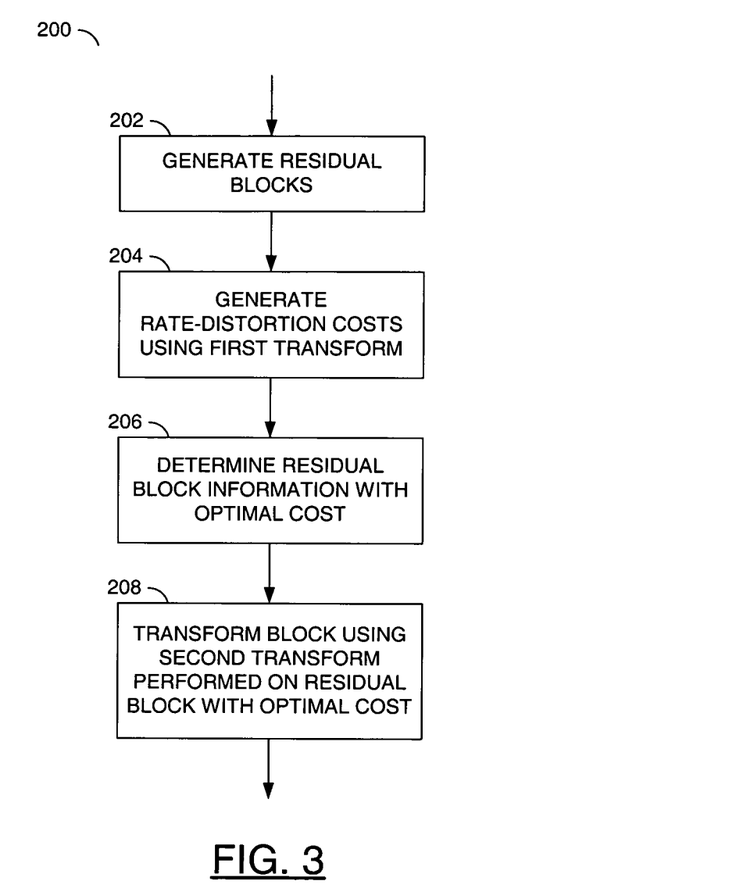
FIG. 3 is a flow diagram of the present invention.

Referring to FIG. 3, a flow diagram 200 of the present invention is shown. The flow diagram 200 generally comprises a step (or state) 202, a step (or state) 204, a step (or state) 206 and a step (or state) 208. The step 202 may be used to generate residual blocks. The step 204 may be used to generate rate-distortion costs using a first transform. The state 206 may be used to determine residual block information with optimal costs. The state 208 may transform a particular block using a second transform performed on a residual block with the optimal cost information previously calculated.

Figure 4:
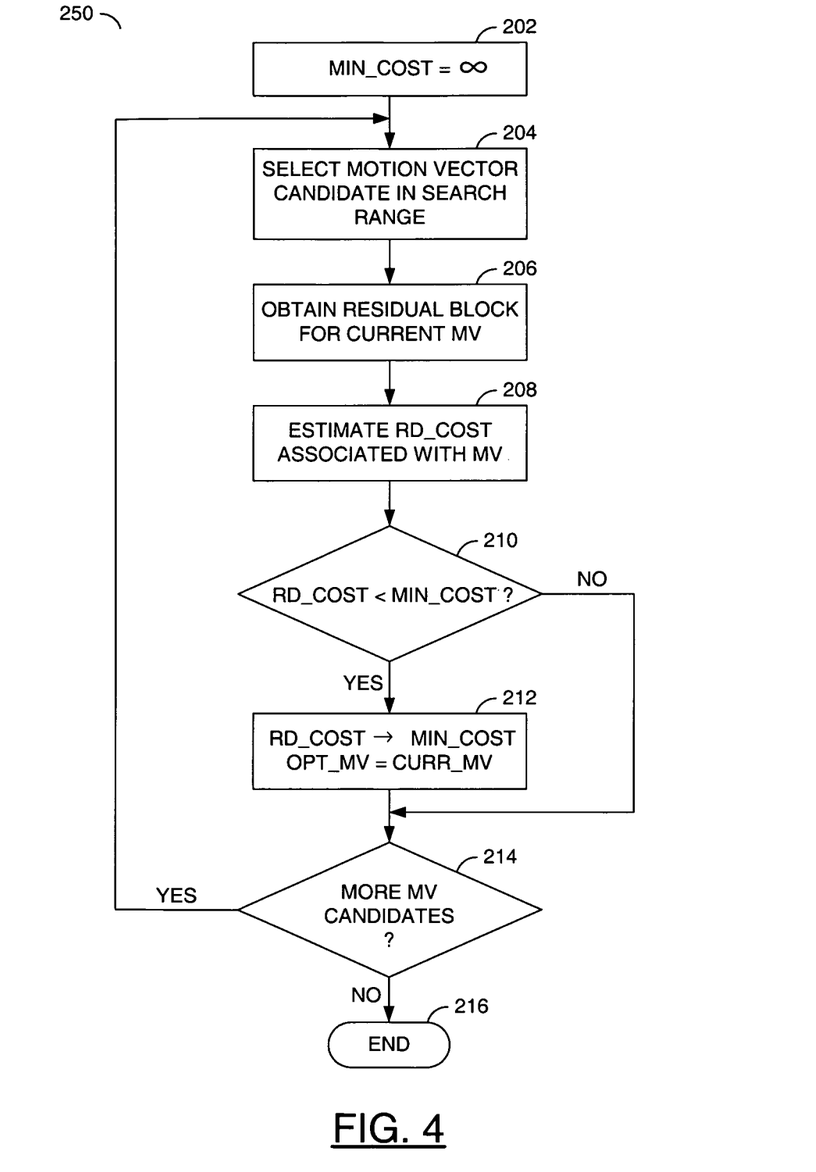
FIG. 4 is a more detailed flow diagram of the present invention.

Referring to FIG. 4, a more detailed flow diagram 250 of the present invention is shown. The flow diagram 250 generally comprises a step (or state) 202, a step (or state) 204, a step (or state) 206, a step (or state) 208, a decision step (or state) 210, a step (or state) 212, a decision step (or state) 214 and a step (or state) 216. The step 202 may set a minimum cost equal to a first variable (e.g., infinity). The step 204 may select a motion vector candidate within a predetermined search range. The step 208 may obtain residual block information for a current motion vector. The step 208 may estimate a rate distortion cost associated with a current motion vector. The step 210 determines whether the rate distortion cost is less than the minimum cost. If so, the method 250 moves to the state 212. If not, the method 250 moves to the state 214. The step 212 compares the rate distortion cost with the minimum cost and sets the optimal motion vectors to the current motion vectors. Next, the state 214 determines whether more motion vector candidates are present. If so, the method 250 moves back to the state 204 and repeats the steps 204 through 214. If more motion vector candidates are not present, the method 250 moves to the state 216 and ends.

Figure 5:
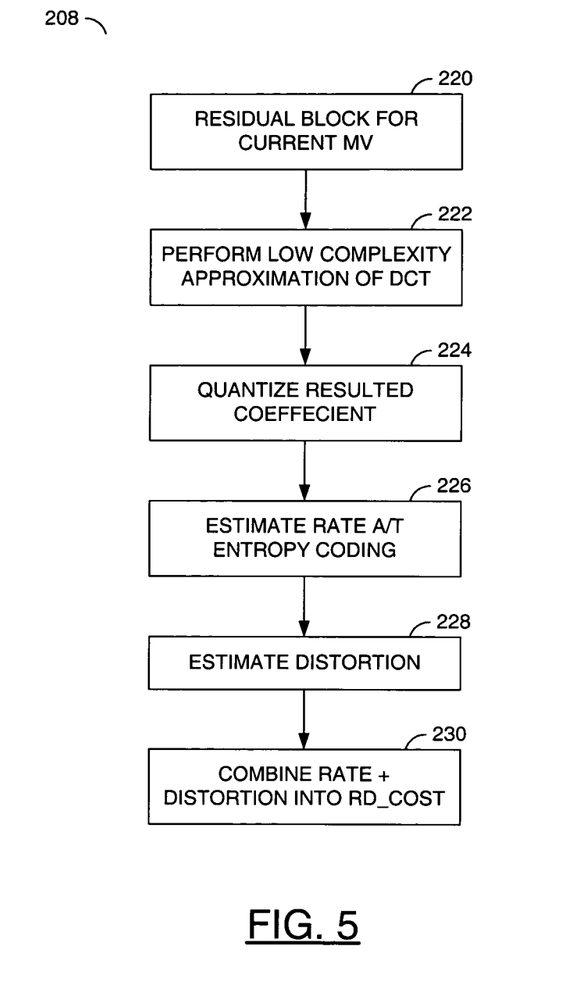
FIG. 5 is a flow diagram of a rate distortion cost estimation.

Referring to FIG. 5, a more detailed flow diagram of the rate distortion cost estimate step 208 is shown. The step 208 generally comprises a step (or state) 220, a step (or state) 222, a step (or state) 224, a step (or state) 226, a step (or state) 228 and a step (or state) 230. The step 220 may analyze a residual block for a current motion vector. The state 222 performs a low complexity approximation of the DCT. The state 224 quantizes the resulted coefficient. The state 226 estimates a rate and performs entropy coding. The state 228 estimates a distortion. The state 230 combines rate and distortion into a rate distortion cost.

Figure 6:
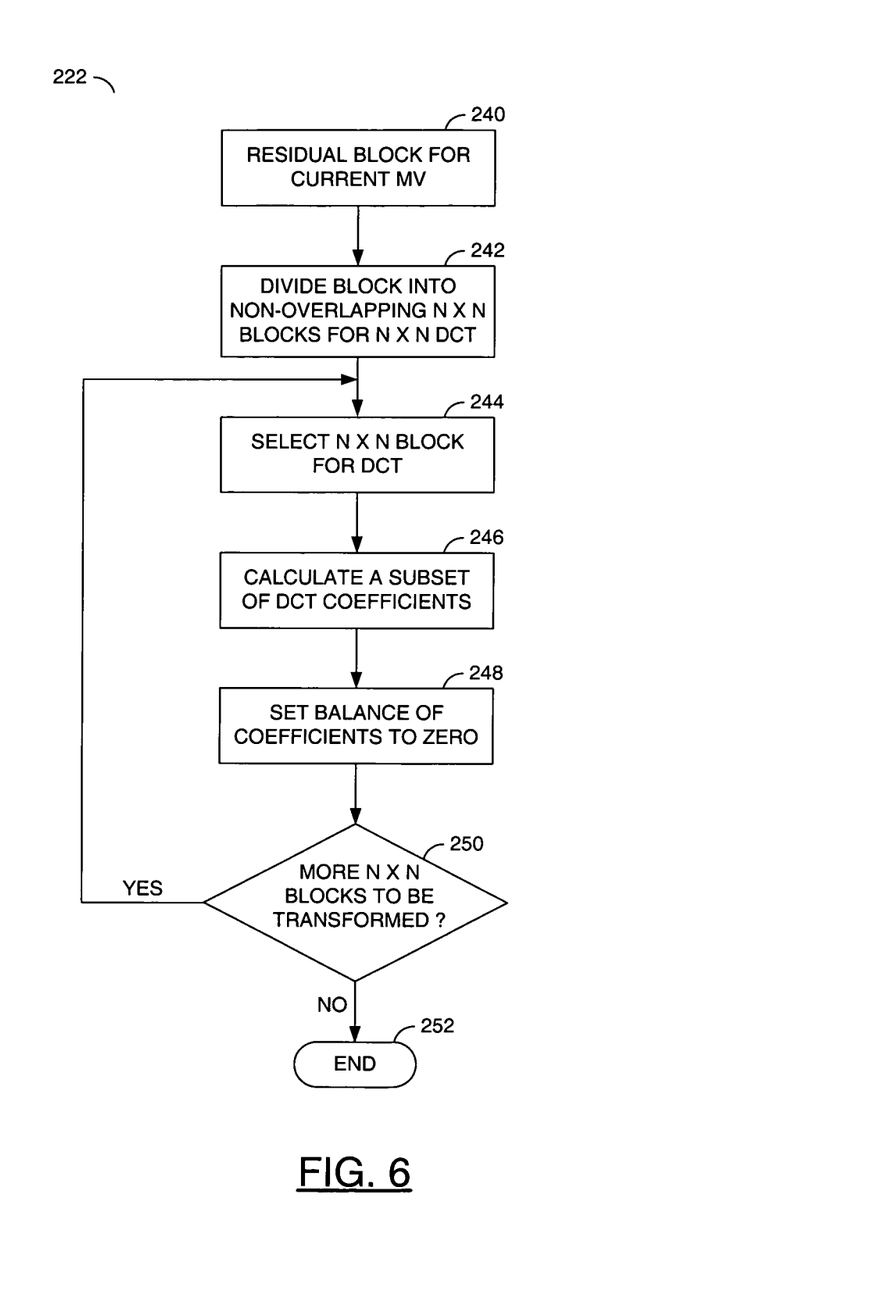
FIG. 6 is a flow diagram of a first portion of the DCT estimation.

Referring to FIG. 6, a more detailed diagram of the state 222 is shown. The state 222 generally comprises a step (or state) 240, a step (or state) 240, a step (or state) 242, a step (or state) 244, a step (or state) 246, a step (or state) 248, a decision step (or state) 250 and a step (or state) 252. The step 240 selects a residual block for the current motion vector. The state 242 divides a selected block into a non-overlapping block for a DCT transform. The state 244 selects an N×N block for DCT transforming, as specified by the particular video coding standard implemented. For example, in H.263/MPEG-1,2,4, N=8. For a H.264/AVC base line, N=4. The state 246 calculates a sub-set of DCT coefficients. The step 248 selects the balance of coefficients to zero. The state 250 determines if more N×N blocks need to be transformed. If so, the method moves back to the step 244. If not, the method moves to the state 252 and ends.

Figure 7:
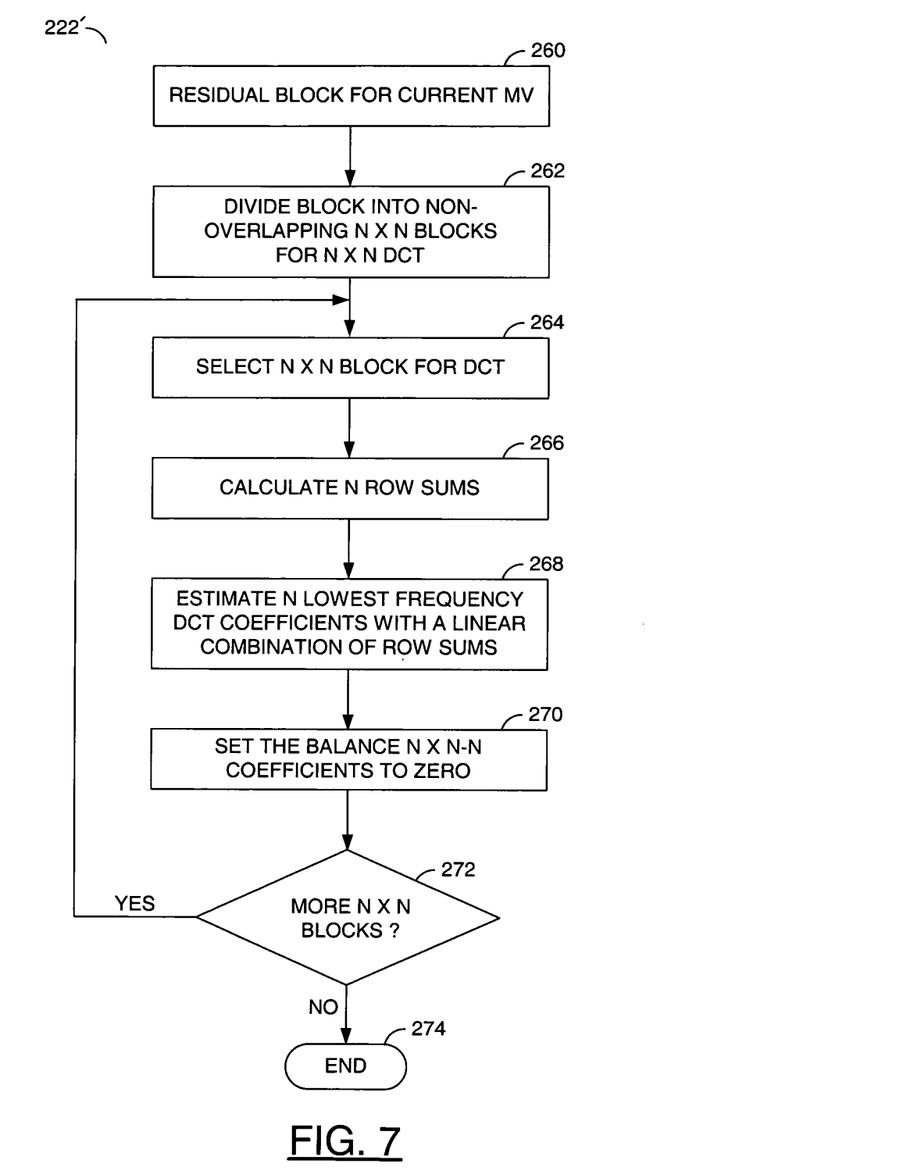
FIG. 7 is a flow diagram of a second portion of the DCT estimation.

Referring to FIG. 7, an alternate flow diagram of the state 222' is shown. The state 222' generally comprises a state (or step) 260, a state (or step) 262, a state (or step) 264, a state (or step) 266, a state (or step) 268, a state (or step) 270, a decision step (or state) 272 and a step (or state) 274. The state 260 selects a residual block or current motion vector analysis. The state 262 divides the selected block into a non-overlapping N×N block for N×N DCT transforming. The step 264 selects an N×N block for DCT transforming. The step 266 calculates N row sums. The state 268 estimates a lowest frequency DCT coefficient with a linear combination of row sums. The state 270 sets the balance of N×N coefficients to zero. The decision state 272 determines if more N×N blocks need to be processed. If so, the method moves back to the state 264. If not, the method ends at the state 274.

In one embodiment, for each of the MV candidates to be evaluated during motion estimation, a residual block is obtained, while 4×4 Hadamard transform is performed in place of the traditional 4×4 DCT transform used in the H.264 standard. After the 4×4 Hadamard transform, quantization and entropy coding are performed on HT coefficients (as opposed to DCT coefficients). The rate and distortion information are calculated to arrive at rated distortion cost associated with the current MV candidate. The MV candidate with the lowest rate distortion cost will be chosen and used for coding. Since the final transformation uses coefficients from a DCT transform, the final bitstream is normally compliant with a desired coding standard. While a Hadamard transform has been described as an example of a low cost transform, other low cost transforms may be implemented to meet the design criteria of a particular implementation.

In one embodiment, the distortion information in rate distortion cost (i.e., distortion between the original block and the reconstructed block as a result of quantizing DCT/HT coefficients of the residual block), may be replaced by the distortion prior to quantization. The distortion between the original block and the motion compensated block may use the current MV candidate.

In modern video coding systems, such as H.264, entropy coding of transform coefficient information is performed adaptively, exploiting correlations between neighboring blocks. In such an implementation, when ME for different partitions in a MB are performed independently of each other, the correct context information for the adaptive and context based entropy coding may not always be readily available. Therefore, in one embodiment of the present invention an estimate may be in place of the actual bit rate associated with each MV candidate (with HT coefficients used in lieu of DCT coefficients).

When estimating the overall bit rate based on partial information available to the ME for the current partition in an MB, the partial information may be treated as boundary conditions. An estimate of the overall bit rate the average of the bit rates for MBs that satisfies the boundary condition may be used.

According to the present invention, the current partition of the video signal to be encoded may be examined. The marginal contribution to the total bit rate for the entire residual block using context based adaptive entropy coding may be estimated before the coded representations of neighboring partitions of the residual block are determined. The estimation may be obtained by averaging the marginal contribution of the current partition to all residual blocks with the current partition being equal to the current input.

Typical residual blocks after motion prediction have energy concentrated in low frequency DCT/HT coefficients. In another example of the present invention, only the lowest frequency DCT/HT coefficients are calculated and used in the estimate rate and/or distortion information in RD cost calculation for each MV candidate. All other DCT/HT coefficients may be assumed to be zero after quantization.

Since direct calculation of the lowest frequency HT coefficients still involves both row and column transforms and therefore buffering of residual block pixel values, an alternate for estimating only the 4 lowest frequency HT coefficients may be implemented as follows:

Denote input residual 4×4 blocks $$X_k = \begin{bmatrix} x_{00k} & x_{01k} & x_{02k} & x_{03k} \\ x_{10k} & x_{11k} & x_{12k} & x_{13k} \\ x_{20k} & x_{21k} & x_{22k} & x_{23k} \\ x_{30k} & x_{31k} & x_{32k} & x_{33k} \end{bmatrix} \quad (1)$$

the corresponding row sums of the input as $$h_{ik} = \sum_j x_{ijk} \quad (2)$$

and the Hadamard coefficients $$Y_k = \begin{bmatrix} y_{00k} & y_{01k} & y_{02k} & y_{03k} \\ y_{10k} & y_{11k} & y_{12k} & y_{13k} \\ y_{20k} & y_{21k} & y_{22k} & y_{23k} \\ y_{30k} & y_{31k} & y_{32k} & y_{33k} \end{bmatrix} \quad (3)$$

Estimate the 4 lowest frequency Hadamard coefficients with linear combinations of row sums $$y_{ij} = \sum_l a_{ijl} h_l \quad (4)$$

that minimizes $$d_{ij} = \sum_k \left( y_{ijk} - \sum_l a_{ijl} h_{ik} \right)^2 \quad (5)$$

to generate $$\frac{\partial d_{ij}}{\partial a_{ijl}} \quad (6)$$

or $$\sum_k \left( y_{ijk} - \sum_m a_{ijm} h_{mk} \right) h_{lk} = 0 \quad (7)$$

$$\sum_m a_{ijm} \sum_k h_{mk} h_{lk} = \sum_k y_{ijk} h_{lk} \quad (8)$$

$$\begin{bmatrix} \sum_k h_{0k}h_{0k} & \sum_k h_{1k}h_{0k} & \sum_k h_{2k}h_{0k} & \sum_k h_{3k}h_{0k} \\ \sum_k h_{0k}h_{1k} & \sum_k h_{1k}h_{1k} & \sum_k h_{2k}h_{1k} & \sum_k h_{3k}h_{1k} \\ \sum_k h_{0k}h_{2k} & \sum_k h_{1k}h_{2k} & \sum_k h_{2k}h_{2k} & \sum_k h_{3k}h_{2k} \\ \sum_k h_{0k}h_{3k} & \sum_k h_{1k}h_{3k} & \sum_k h_{2k}h_{3k} & \sum_k h_{3k}h_{3k} \end{bmatrix} \begin{bmatrix} a_{ij0} \\ a_{ij1} \\ a_{ij2} \\ a_{ij3} \end{bmatrix} = \begin{bmatrix} \sum_k y_{ijk}h_{0k} \\ \sum_k y_{ijk}h_{1k} \\ \sum_k y_{ijk}h_{2k} \\ \sum_k y_{ijk}h_{3k} \end{bmatrix} \quad (9)$$

Given a series of training data of residual blocks and the corresponding HT coefficients, the corresponding coefficients $a_{ijl}$ in equation (4) may be derived. For each residual block corresponding to each MV candidate, the corresponding row sums are calculated with equation (2) using the coefficient $a_{ij}$ obtained by solving the equation (9) and then the four lowest frequencies. The HT coefficients are estimated using the equation (4). The coefficients $a_{ijl}$ may subsequently be used by the ME to estimate HT coefficients based on which RD cost for the corresponding MV candidate can be derived.

Although the present invention has been described in the context of motion estimation, those skilled in the art may easily adapt the idea for applications in other modules in video coding where a full rate distortion trade off is desired but a full fledged accurate calculation of the RD calculation is deemed too complex. These other modules include frame/field coding decisions, reference frame selection, optimization of bi-directional prediction, and etc. Other simple transforms may also be used in place of the Hadamard transform. Quality criteria other than rate distortion tradeoffs may also be implemented.

While the invention has been particularly shown and described with reference to the preferred embodiments thereof, it will be understood by those skilled in the art that various changes in form and details may be made without departing from the spirit and scope of the invention.

The invention claimed is:

1. A method of motion estimation for video processing, said method comprising steps of:
    (A) receiving a current block of a video signal comprising a series of frames, wherein each frame comprises a plurality of blocks;

(B) determining an optimal residual block having an optimal rate-distortion cost for the current block, further comprising steps of:
(1) generating a plurality of residual blocks by performing motion compensation on the current block;
(2) generating a plurality of rate-distortion costs for a plurality of generated bitstream segments using a first transform for each of the plurality of residual blocks;
(3) selecting the optimal residual block having the optimal rate-distortion cost from the plurality of residual blocks; and
(C) transforming said optimal residual block for the purpose of encoding using a second transform, wherein the second transform has a higher complexity than the first transform, said second transform being performed on the optimal residual block in a condition corresponding to the residual block before the first transform is performed on the optimal residual block, and said first and second transforms are associated with two distinct modes in a transform circuit.

2. The method according to claim 1, wherein said method implements a comprehensive performance evaluation of one or more encoding decisions and/or parameters.

3. The method according to claim 1, wherein the first transform for generating a plurality of rate-distortion costs comprises a Hadamard transform and the second transform directed to transforming said selected residual block with said optimal cost comprises a Discrete Cosine Transform (DCT).

4. The method according to claim 3, wherein step (C) generates an H.264 compliant coded video signal.

5. The method according to claim 1, further comprising the step of:
calculating a plurality of estimated distortions for said residual blocks, wherein (i) each one of said distortions is between one of reconstructed blocks after transforming said residual blocks, quantizing resulted transform coefficients, dequantization and inverse transform dequantized coefficients and a respective reference block from a reference frame and (ii) said rate-distortion costs are based on said estimated distortions.

6. The method according to claim 1, further comprising the step of:
calculating a plurality of estimated bit rates for coded representation of said residual block by performing quantization and entropy coding of said low complexity transform that would have been performed on DCT coefficients.

7. The method according to claim 6, further comprising the step of:
estimating the bit rate for the coded representation of the said residual block by applying prior art methods for estimating bit rate for representing quantized DCT coefficients to quantized low complexity transform coefficients.

8. The method according to claim 6, further comprising the step of:
estimating the bit rate for the coded representation of the said residual block when context based adaptive entropy coding is applied.

9. The method according to claim 1, wherein sub-step (2) in step (B) comprises the sub-step of:
calculating only a portion of each of a number of coefficient sets, wherein each of said portions comprises a respective at least one lowest frequency coefficient.

10. The method according to claim 1, wherein sub-step (2) in step (B) comprises calculating a subset of coefficients of the said low complexity transform.

11. The method according to claim 10, wherein the subset of coefficients are the four coefficients at the upper left corner of the coefficients in the transform domain.

12. The method according to claim 10, wherein the subset of coefficients are estimated from the pixel domain using pixel domain characteristics without performing exact transform.

13. The method according to claim 10, wherein the subset of coefficients are estimated with a linear combination of row sums of the residual signal.

14. The method according to claim 1, wherein said method implements a comprehensive performance evaluation of one or more encoding decisions and/or parameters.

15. An apparatus comprising:
a motion estimation circuit configured to generate a plurality of residual blocks by performing motion compensation on a current block received from a video signal;
a transform circuit configured to generate a plurality of rate-distortion costs for a plurality of generated bitstream segments using a first transform for each of the plurality of residual blocks;
a rate distortion circuit configured to select an optimal block having the optimal rate-distortion cost from the plurality of residual blocks;
wherein the transform circuit is further configured to transform said optimal residual block for the purpose of encoding, using a second transform, wherein the second transform has a higher complexity than the first transform, said transform circuit configured to transform the optimal residual block using the second transform in a condition corresponding to the residual block before the first transform is performed on the optimal residual block, and said first and second transforms are associated with two distinct modes in a transform circuit.

16. The apparatus according to claim 15, wherein said bitstream is H.264 compliant.

17. The apparatus according to claim 15, wherein said first transform comprises a Hadamard transform and the second transform comprises a Discrete Cosine Transform (DCT).

18. The apparatus according to claim 15, wherein said first transform has a lower complexity than a DCT transform.

* * * * *